United States Patent
Lee

(10) Patent No.: US 8,794,958 B1
(45) Date of Patent: Aug. 5, 2014

(54) EJECTION MECHANISM

(71) Applicant: Han Sum Enterprise Co., Ltd., Tainan (TW)

(72) Inventor: Te Sheng Lee, Tainan (TW)

(73) Assignee: Han Sum Enterprise Co., Ltd., Tainan (TW)

( * ) Notice: Subject to any disclaimer, the term of this patent is extended or adjusted under 35 U.S.C. 154(b) by 0 days.

(21) Appl. No.: 14/168,797

(22) Filed: Jan. 30, 2014

(30) Foreign Application Priority Data

Jan. 30, 2013 (TW) .............................. 102202040 U

(51) Int. Cl.
*B29C 45/42* (2006.01)
*B29C 33/44* (2006.01)
*B29C 33/28* (2006.01)
*B29C 45/44* (2006.01)

(52) U.S. Cl.
CPC ........... *B29C 33/442* (2013.01); *B29C 45/4208* (2013.01); *B29C 45/4471* (2013.01); *B29C 33/28* (2013.01); *Y10S 425/058* (2013.01)
USPC ............. 425/444; 425/436 RM; 425/DIG. 58

(58) Field of Classification Search
CPC ........ B29C 33/28; B29C 33/34; B29C 33/26; B29C 45/42; B29C 45/4208; B29C 45/44; B29C 45/4471; B21D 45/10; B21D 45/02; B21D 45/06
USPC ............ 425/444, 436 RM, 556, 577, DIG. 58
See application file for complete search history.

(56) References Cited

U.S. PATENT DOCUMENTS

| | | | | |
|---|---|---|---|---|
| 3,890,079 A | * | 6/1975 | Slater ............................. | 425/155 |
| 4,239,474 A | * | 12/1980 | Nakagawa ..................... | 425/525 |
| 4,738,612 A | * | 4/1988 | Kikuchi et al. ................ | 425/532 |
| 5,229,143 A | * | 7/1993 | Ogura et al. ................... | 425/532 |
| 5,264,178 A | * | 11/1993 | Yamamura et al. ........... | 264/531 |
| 5,464,635 A | * | 11/1995 | Geiger .......................... | 425/532 |

* cited by examiner

*Primary Examiner* — Yogendra Gupta
*Assistant Examiner* — Emmanuel S Luk

(57) ABSTRACT

An ejection mechanism has a base, a rotation disk and a feeding station. The base is configured for mounting of the rotation disk and the feeding station, The base further includes an arched guiding track, and the arched guiding track is disposed around the rotating gear. The rotation disk is fan-shaped and is rotatably coupled to the base by a rotating shaft such that the rotation disk is aligned above the arched guiding track. the rotation disk is further provided with an arched row of teeth on a bottom of the rotation disk corresponding to the rotating gear of the base. The rotation disk driven by the rotating gear causes the arched row of teeth to rotate and also to simultaneously cause the rotation disk to rotate around the rotating shaft on the arched guiding track. The ejection mechanism which is suitable for different sizes of elbow pipes.

6 Claims, 18 Drawing Sheets

US 8,794,958 B1

EJECTION MECHANISM

BACKGROUND OF THE INVENTION

1. Field of the Invention

The present invention relates to an ejection mechanism, and more particularly to an ejection mechanism for elbow pipes.

2. Description of Prior Art

Currently, large elbow pipes are formed by a molding method. In order to remove the finished elbow pipe from the forming machine, most common method is manual removal. Another removal method is disclosed in China patent publication No. 201751044, which utilizes a hydraulic cylinder and a pneumatic cylinder to separate elbow pipes from the forming machine. However, it is very difficult to remove the pipe manually and inconvenient to employ both hydraulic cylinder and pneumatic cylinder.

Therefore, it is desirable to provide an ejection mechanism to mitigate and/or obviate the aforementioned problems.

SUMMARY OF THE INVENTION

An objective of the present invention is to provide an ejection mechanism which is suitable for different sizes of elbow pipes.

In order to achieve the above-mentioned objective, an ejection mechanism comprises a base, a rotation disk and a feeding station.

The base is configured for mounting of the rotation disk and the feeding station, the base capable of being disposed adjacent to an elbow pipe forming device and corresponding to a lifting shaft of the elbow pipe forming device.

The base has a driving motor, and the driving motor is rotatably connected to a rotating gear such that the rotating gear is able to be driven by the driving motor to rotate on the base.

The base further includes an arched guiding track, and the arched guiding track is disposed around the rotating gear.

The base further includes a supporting element respectively on two sides of the base, and each supporting element is provided with a rolling wheel at an end of the supporting element.

The rotation disk is fan-shaped and is rotatably coupled to the base by a rotating shaft such that the rotation disk is aligned above the arched guiding track; and the rotation disk is further provided with an arched row of teeth on a bottom of the rotation disk corresponding to the rotating gear of the base, and the arched row of teeth are adjacent to an inner edge of the arched guiding track of the base.

the rotation disk driven by the rotating gear causes the arched row of teeth to rotate and also to simultaneously cause the rotation disk to rotate around the rotating shaft on the arched guiding track.

The rotation disk further includes a guiding slot and a plurality of securing holes.

The feeding station is coupled to the guiding slot and locked with the screw holes of the rotation disk with a plurality of securing members, the feeding station further including a limiting slot with a feeding member, an end of the feeding member pivoted with a limiting rod, another end of the limiting rod protruding through the limiting slot and connected to a stopping block.

The limiting rod is jacketed with a spring and two ends of the spring respectively push against the limiting slot and the feeding member such that the feeding member is pushed out by the spring and stopped by the stopping block.

The limiting slot is covered by a cover configured to secure the feeding member.

DETAILED DESCRIPTION OF THE INVENTION

In a preferred embodiment, an ejection mechanism comprises a base 10, a rotation disk 20 and a feeding station 30.

Figure 5:
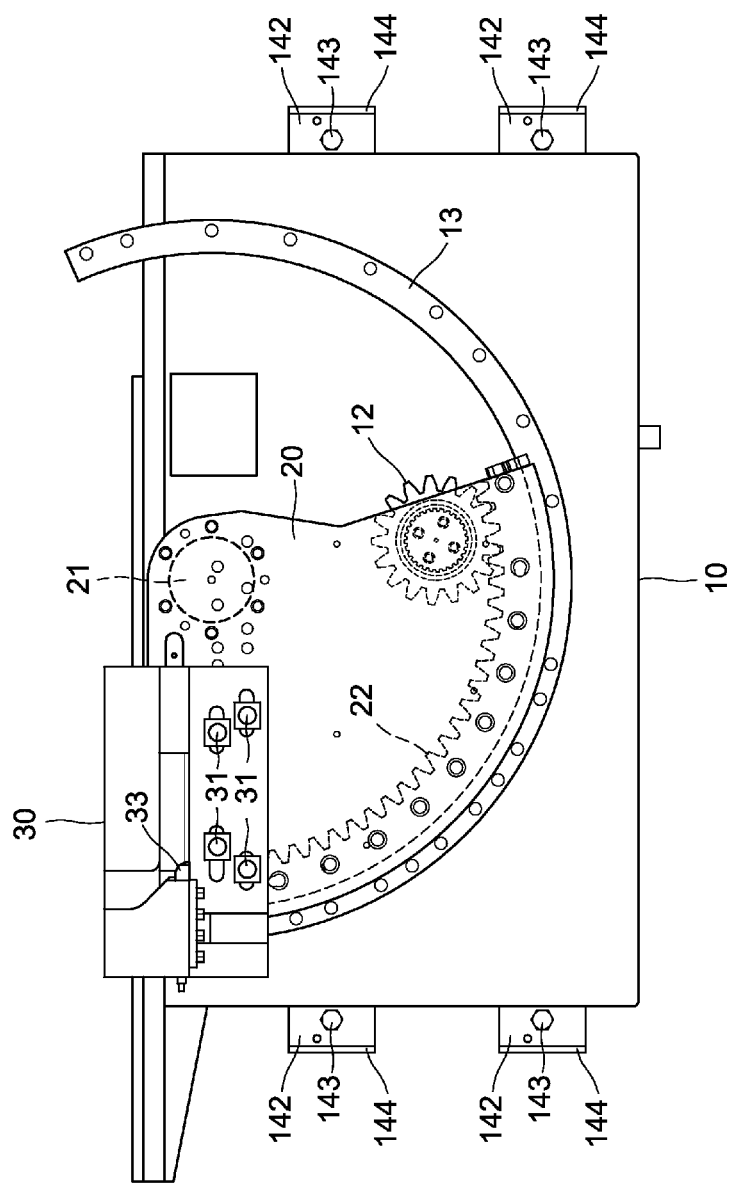
FIG. 5 is a top view of the ejection mechanism according to the embodiment of the present invention.

The base 10 (please refer to FIGS. 5 and 6) is configured for mounting of the rotation disk 20 and the feeding station 30, and the base 10 is capable of being disposed adjacent to an elbow pipe forming device 40 and corresponding to a lifting shaft 41 of the elbow pipe forming device 40. The base 10 has a driving motor 11, and the driving motor 11 is rotatably connected to a rotating gear 12 such that the rotating gear 12 is able to be driven by the driving motor 11 to rotate on the base 10. The base 10 further includes an arched guiding track 13, and the arched guiding track 13 is disposed around the rotating gear 12. The base 10 further includes a supporting element 14 respectively on two sides of the base 10, and each supporting element 14 is provided with a rolling wheel 141 at an end of the supporting element 14. The supporting element 141 are pivoted onto two opposite sides of the base 10 and assembled with a top board 142, an adjustable bolt 143, and a side board 144. The rolling wheels 141 of the supporting elements 14 are used for moving the base 10, and the adjustable bolt 143 is used for adjusting height of the base 10.

The rotation disk 20 (please refer to FIG. 5) is fan-shaped and is rotatably coupled to the base 10 by a rotating shaft 21 such that the rotation disk 20 is aligned above the arched guiding track 13. The rotation disk 20 is further provided with an arched row of teeth 22 on a bottom of the rotation disk 20 corresponding to the rotating gear 12 of the base 10, and the arched row of teeth 22 are adjacent to an inner edge of the arched guiding track 13 of the base 10. The rotation disk 20 driven by the rotating gear 12 causes the arched row of teeth 22 to rotate and also to simultaneously cause the rotation disk 20 to rotate around the rotating shaft 21 on the arched guiding track 13. Furthermore, the rotation disk 20 is provided with a guiding slot 23 and a plurality of securing holes 24.

Figure 3:
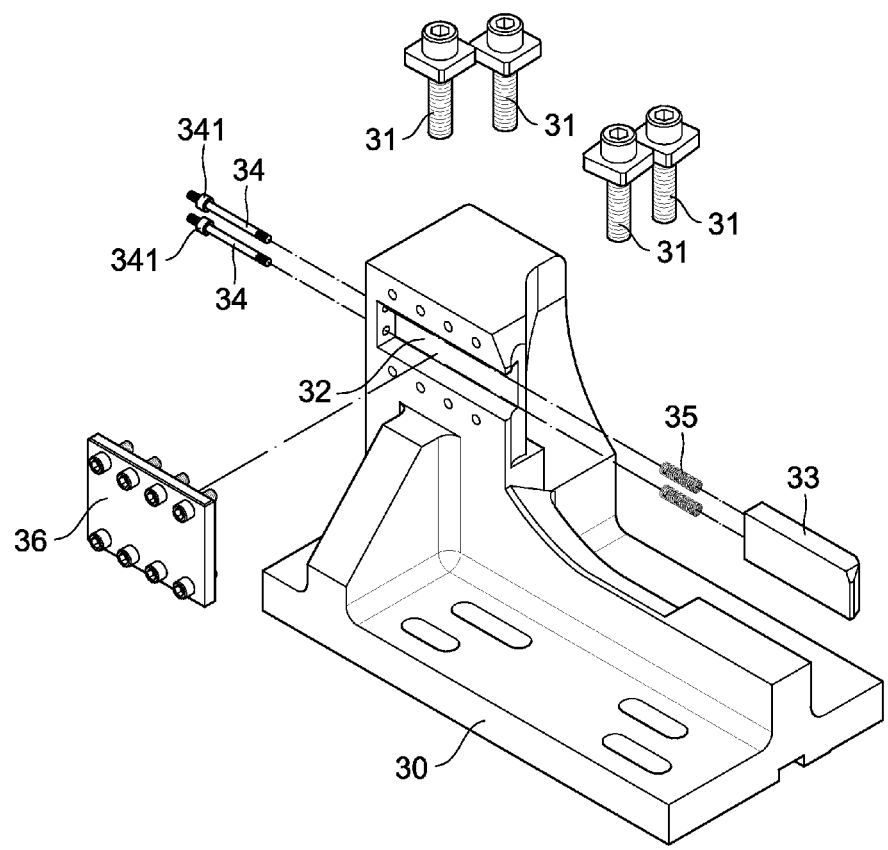
FIG. 3 is an exploded drawing of a feeding station according to the embodiment of the present invention.
Figure 4:
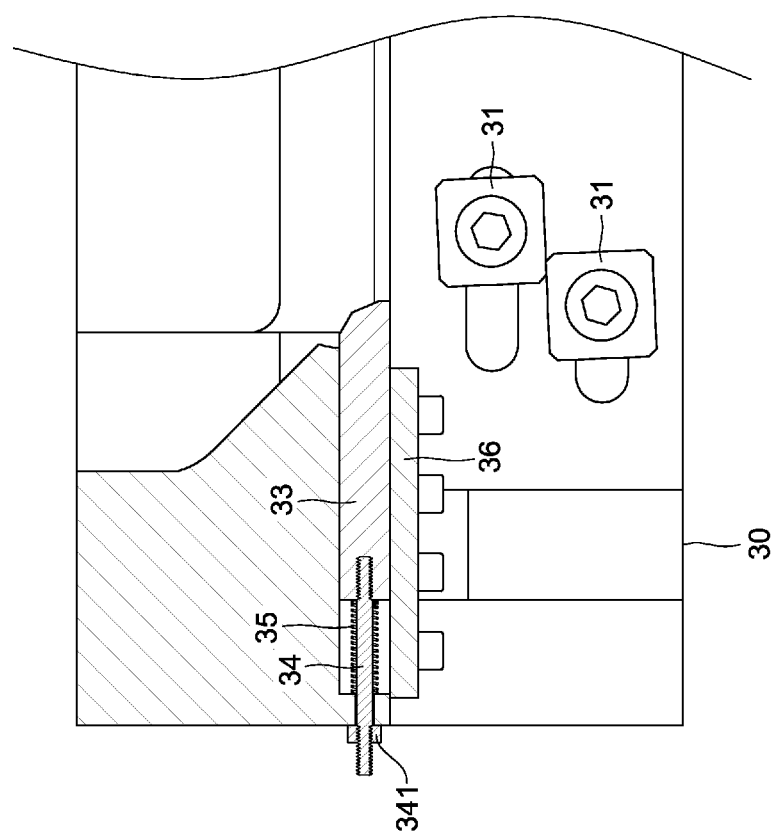
FIG. 4 is a cross-section view of the feeding station according to the embodiment of the present invention.

The feeding station 30 (please refer to FIGS. 3, 4 and 5) is coupled to the guiding slot 23 and locked with the screw holes 24 of the rotation disk 20 with a plurality of securing members 31. The feeding station 30 further including a limiting slot 32 with a feeding member 33, an end of the feeding member 33 is pivoted with a limiting rod 34, and another end of the limiting rod 34 is protruding through the limiting slot 32 and connected to a stopping block 341. The limiting rod 34 is jacketed with a spring 35 and two ends of the spring 35 respectively push against the limiting slot 32 and the feeding member 33 such that the feeding member 33 is pushed out by the spring 35 and stopped by the stopping block 341. The limiting slot 32 is covered by a cover 35 configured to secure the feeding member 33.

Figure 6:
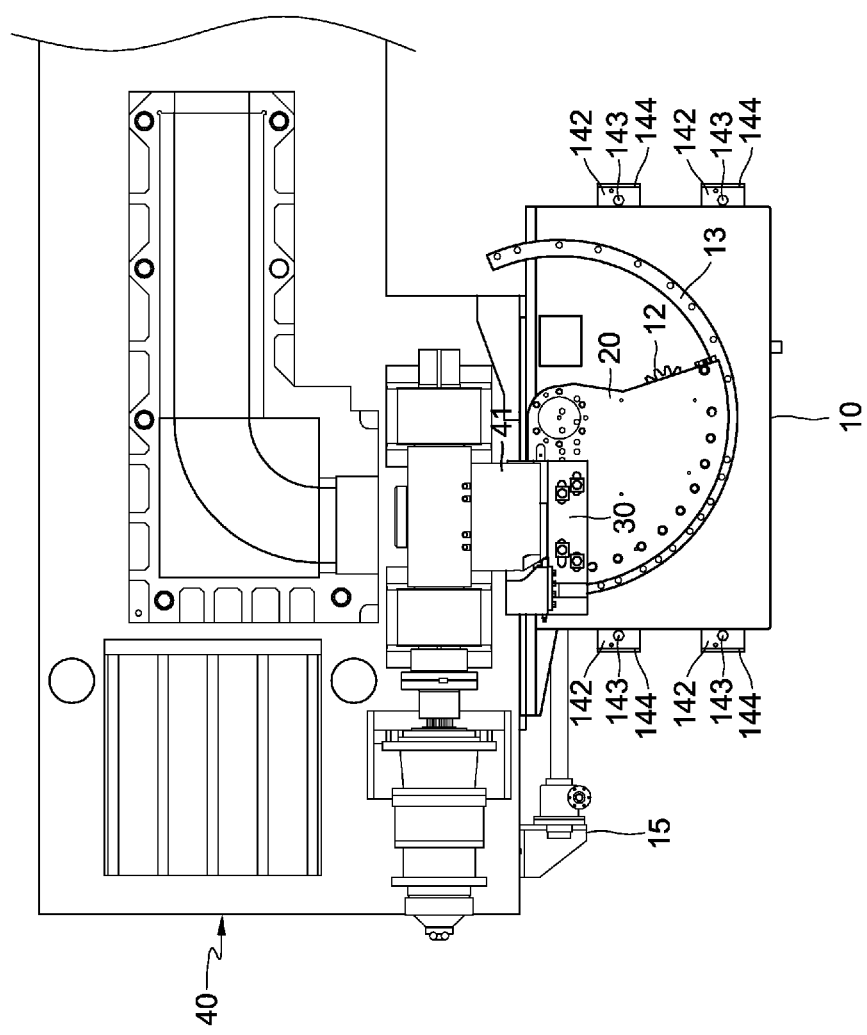
FIG. 6 is a top view of the ejection mechanism and the elbow pipe forming device mechanism according to the embodiment of the present invention.
Figure 7:
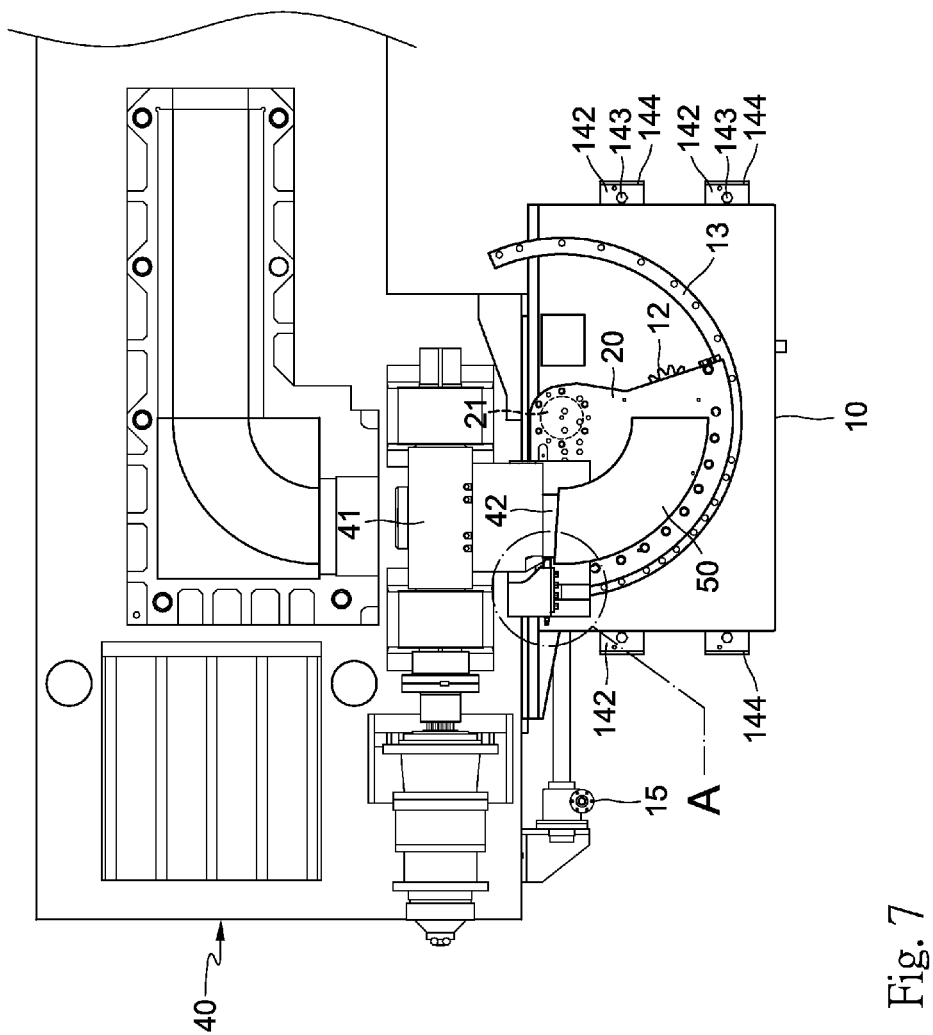
FIG. 7 is a top view of the feeding member mechanism according to the embodiment of the present invention.
Figure 8:
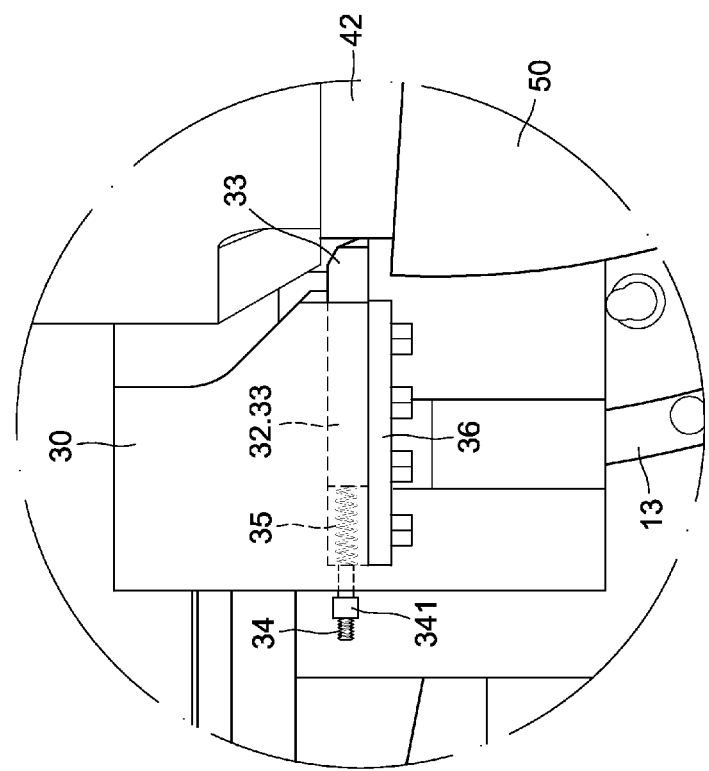
FIG. 8 is a local detail view of the section A shown in FIG. 7.
Figure 9:
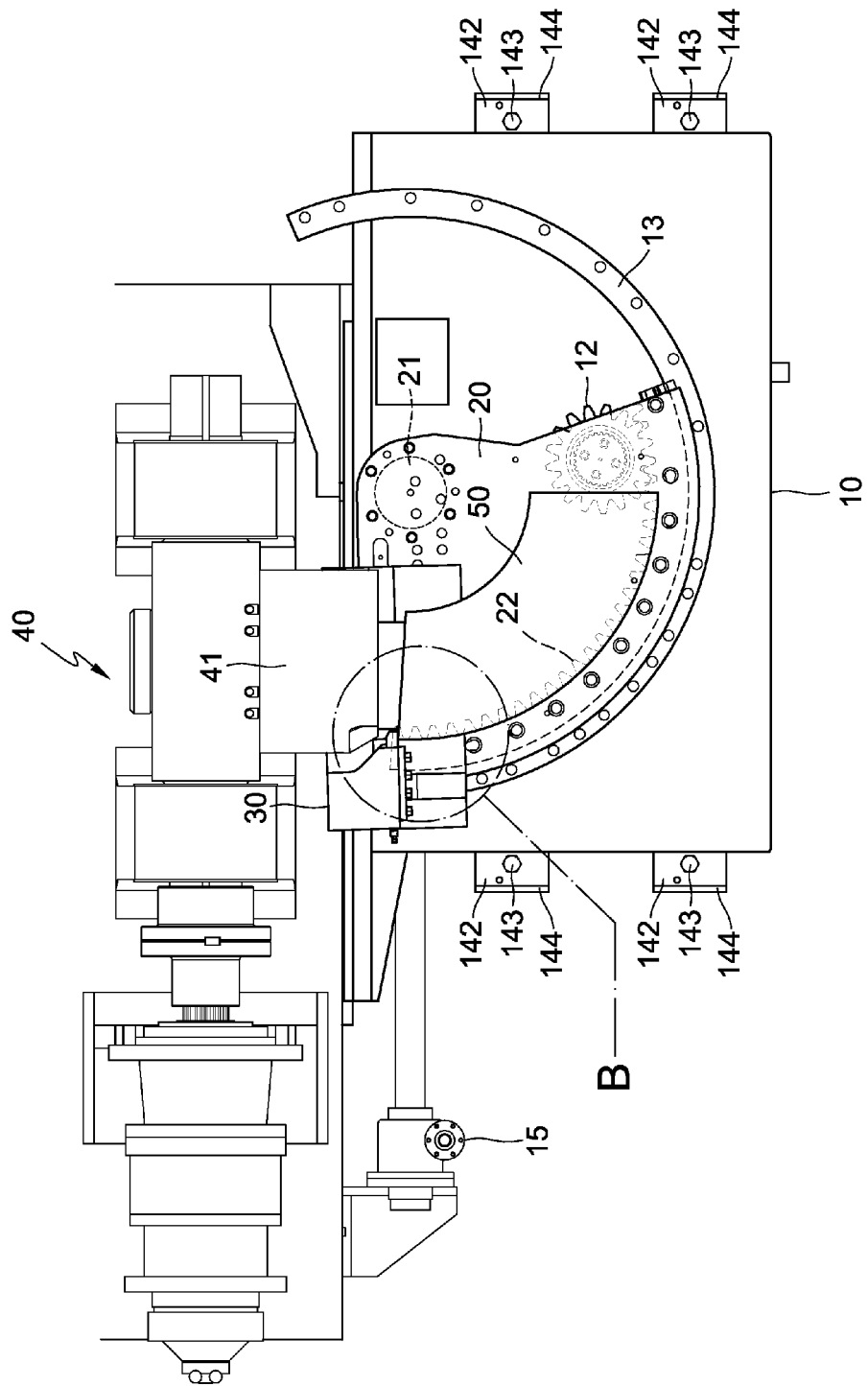
FIG. 9 is a top view of the ejection mechanism and the feeding member according to the embodiment of the present invention.
Figure 10:
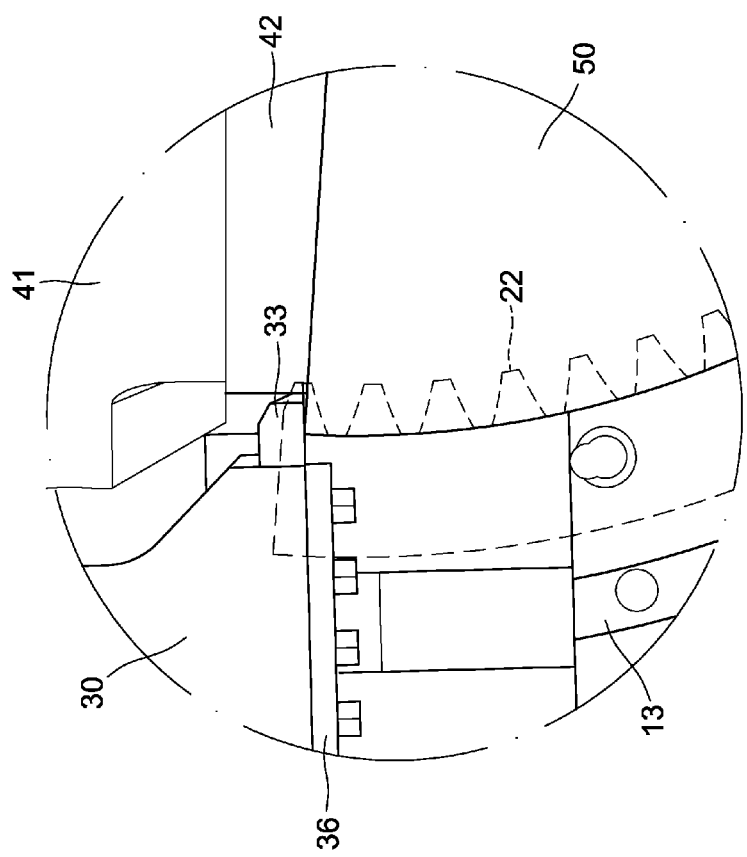
FIG. 10 is a local detail view of the section B shown in FIG. 9.
Figure 11:
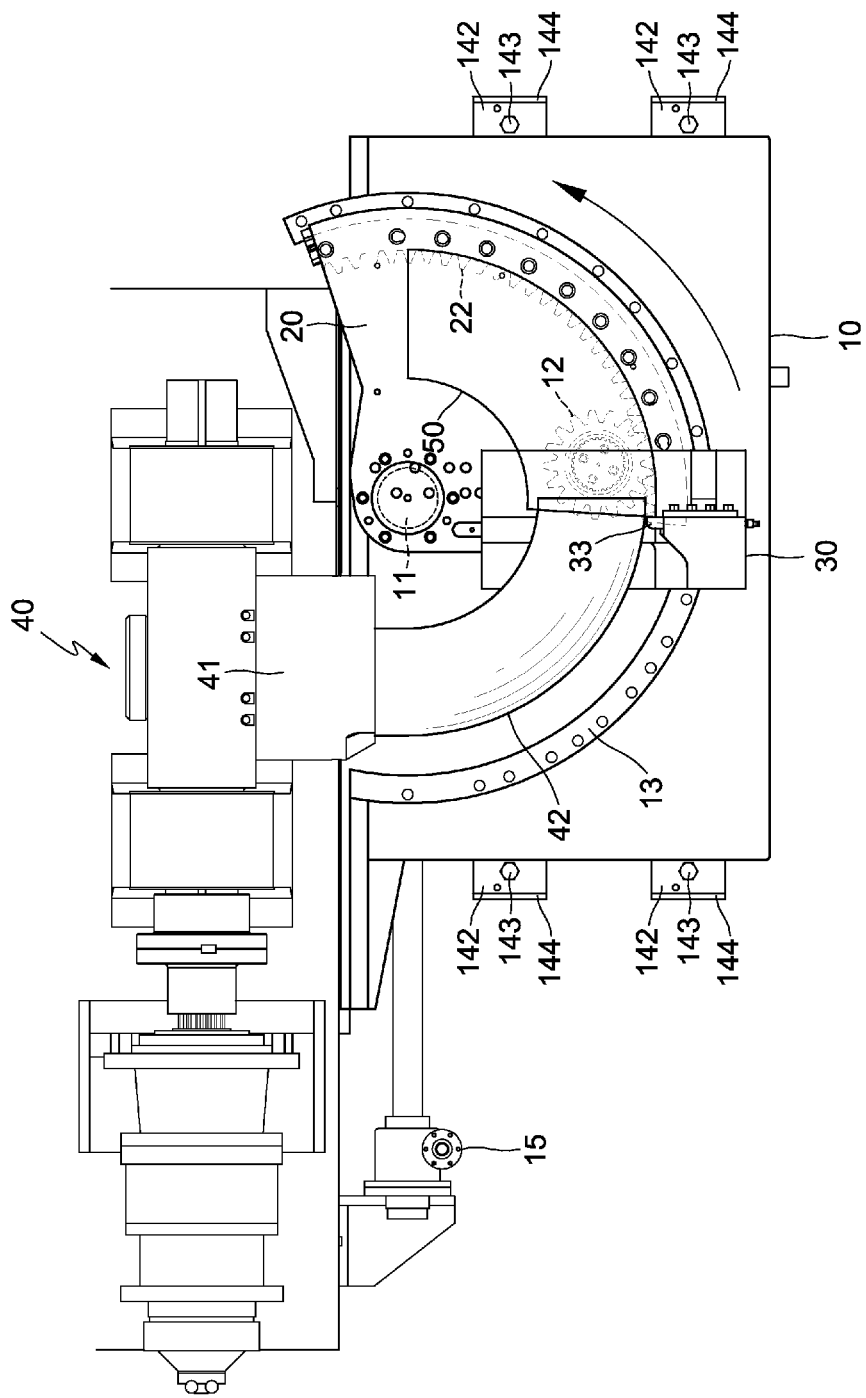
FIG. 11 is a top view of showing rotations of the feeding member.
Figure 12:
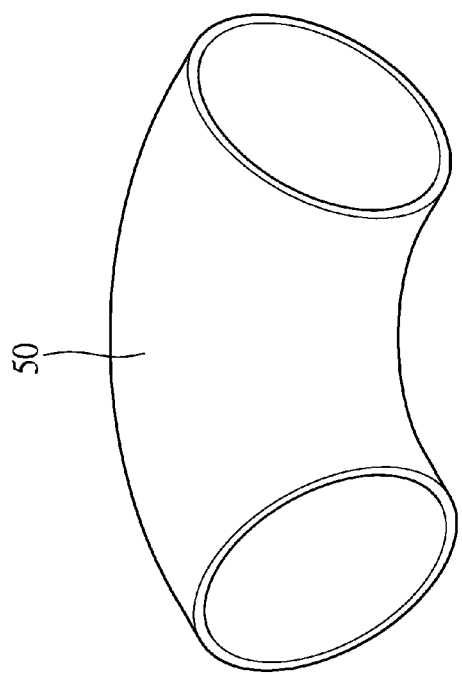
FIG. 12 is a schematic drawing of an elbow pipe.

As shown in FIG. 6, the base 10 is placed at an opposite side of the elbow pipe forming device 40, the rotation disk 20 is corresponding to the lifting shaft 41 of the elbow pipe forming device 40, and the feeding station 30 is placed between the base 10 and the lifting shaft 41. As shown in FIGS. 7 and 8, when the lifting shaft 41 of the elbow pipe forming device 40 lifts and rotates the mold core 42 and the elbow pipe 50 next to the ejection mechanism 10 such that the mold core 42 is above the feeding station 30 and the elbow pipe 50 is above the rotation disk 20. Meanwhile, a front end of the feeding member 33 of the feeding station 30 pushes against an edge of the mold core 42. When the rotating gear 12 rotates counter-clockwise to drive the arched row of teeth 22 of the rotation disk 20, the rotation disk 20 rotates around the rotating shaft 21 and causes the feeding station 30 to rotate simultaneously, such that the feeding member 33 of the feeding station 30 pushes against an opening of the elbow pipe 50 (as shown in FIGS. 9 and 10). Furthermore, the rotating gear 12 continuously rotates the rotation disk 20 counter-clockwise, with the rotation of the rotation disk 20, the feeding member 33 pushes out the elbow pipe 50 out from the mold core 42 (as shown in FIG. 11) to obtain the finished elbow pipe 50 (as shown in FIG. 12). Finally, the lifting shaft 41 of the elbow pipe forming device 40 lifts and rotate the mold core 42 and the elbow pipe 50 back to the original position for next procedure.

Figure 13:
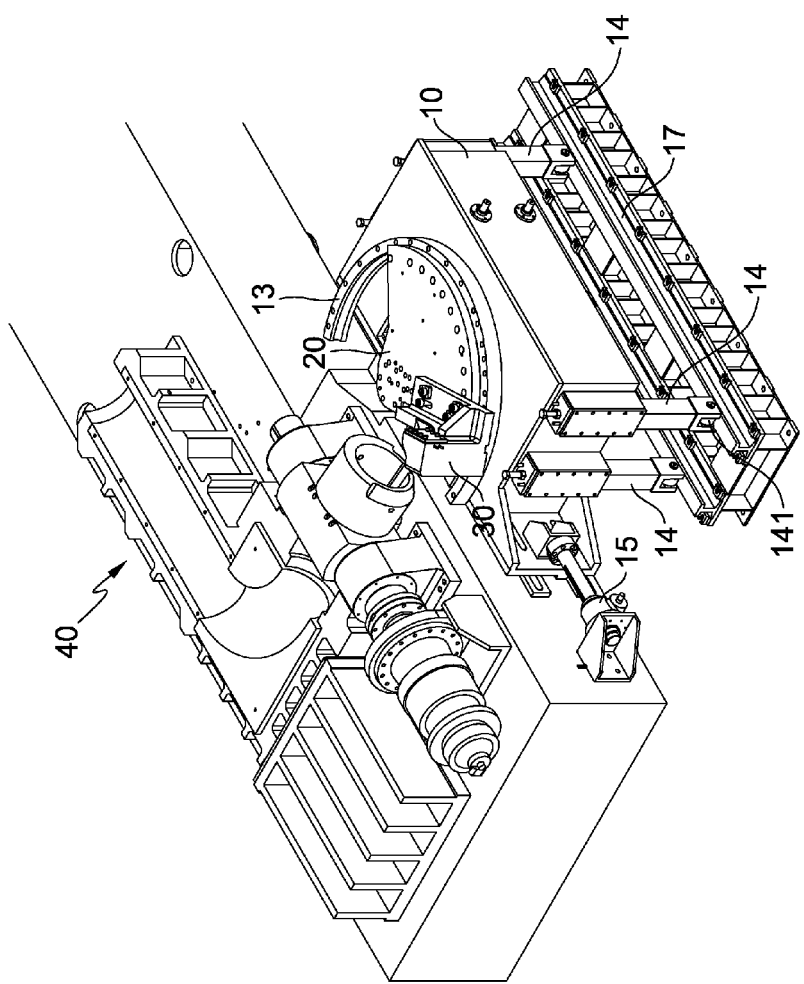
FIG. 13 is a perspective drawing of a screw driving mechanism being mounted between ejection mechanism and the elbow pipe forming device according to the embodiment of the present invention.
Figure 14:
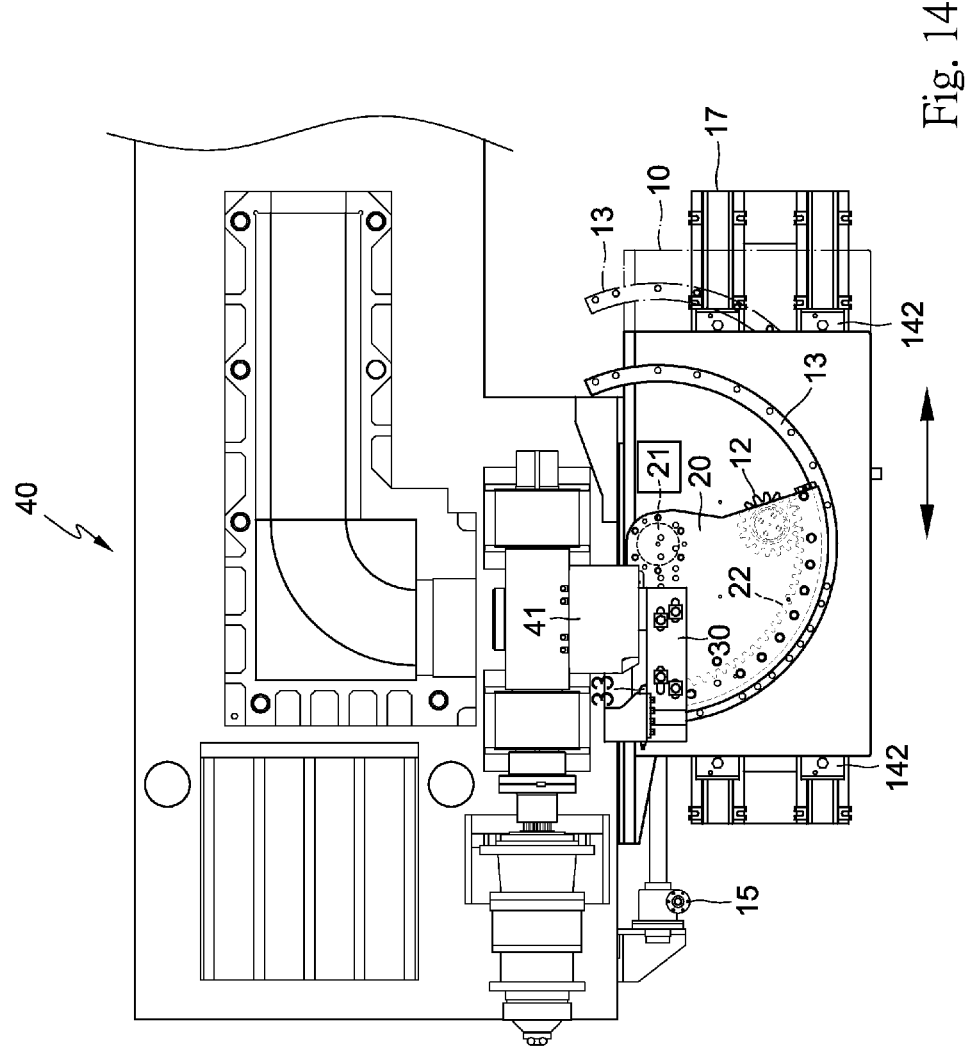
FIG. 14 is a top view of showing the movements of the base according to the embodiment of the present invention.

As shown in FIGS. 13 and 14, a screw drive mechanism 15 is coupled to the base 10, and an end of the screw drive mechanism 15 is coupled to the elbow pipe forming device 40, such that the base 10 is capable of being driven by the screw drive mechanism 15 to move along elbow pipe forming device 40.

Figure 1:
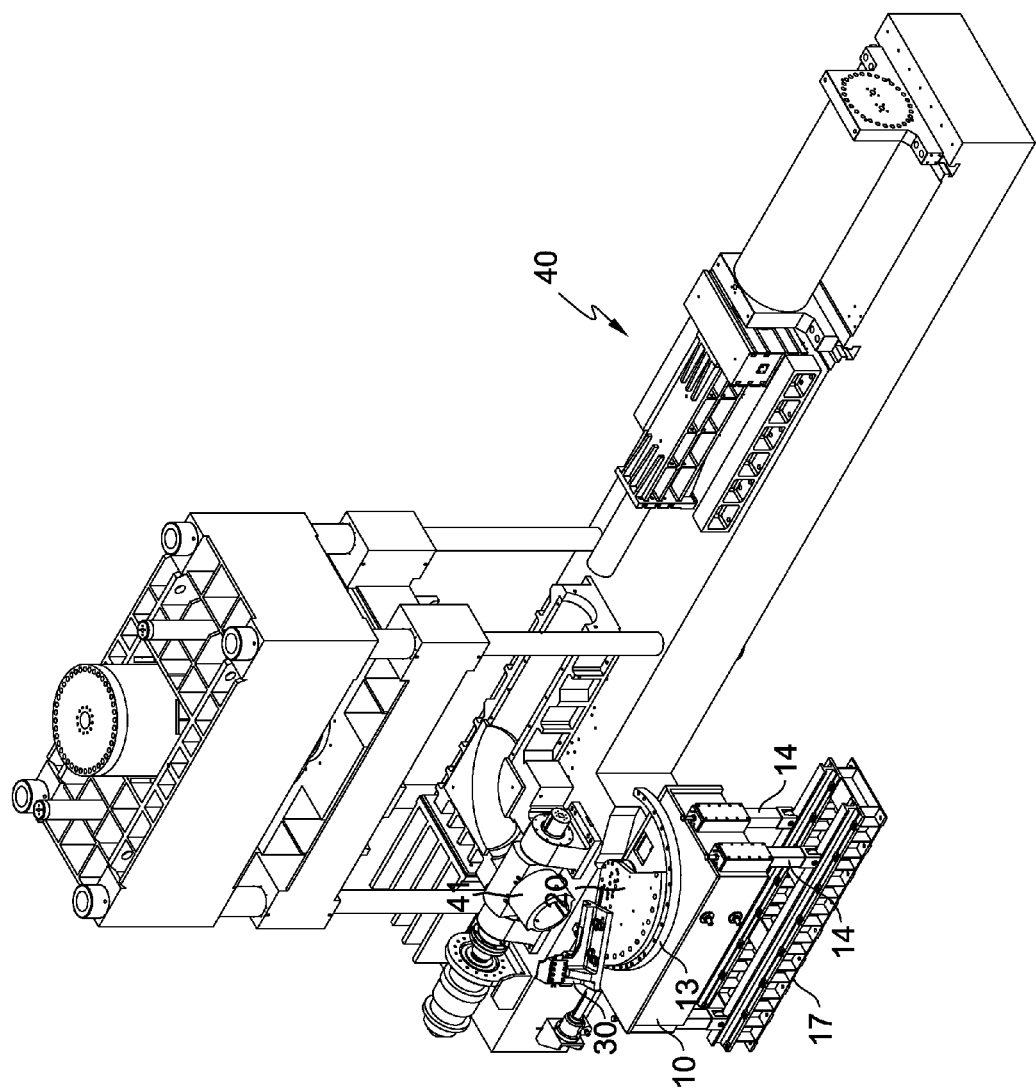
FIG. 1 is a perspective drawing of an ejection mechanism with an elbow pipe forming device according to an embodiment of the present invention.
Figure 2:
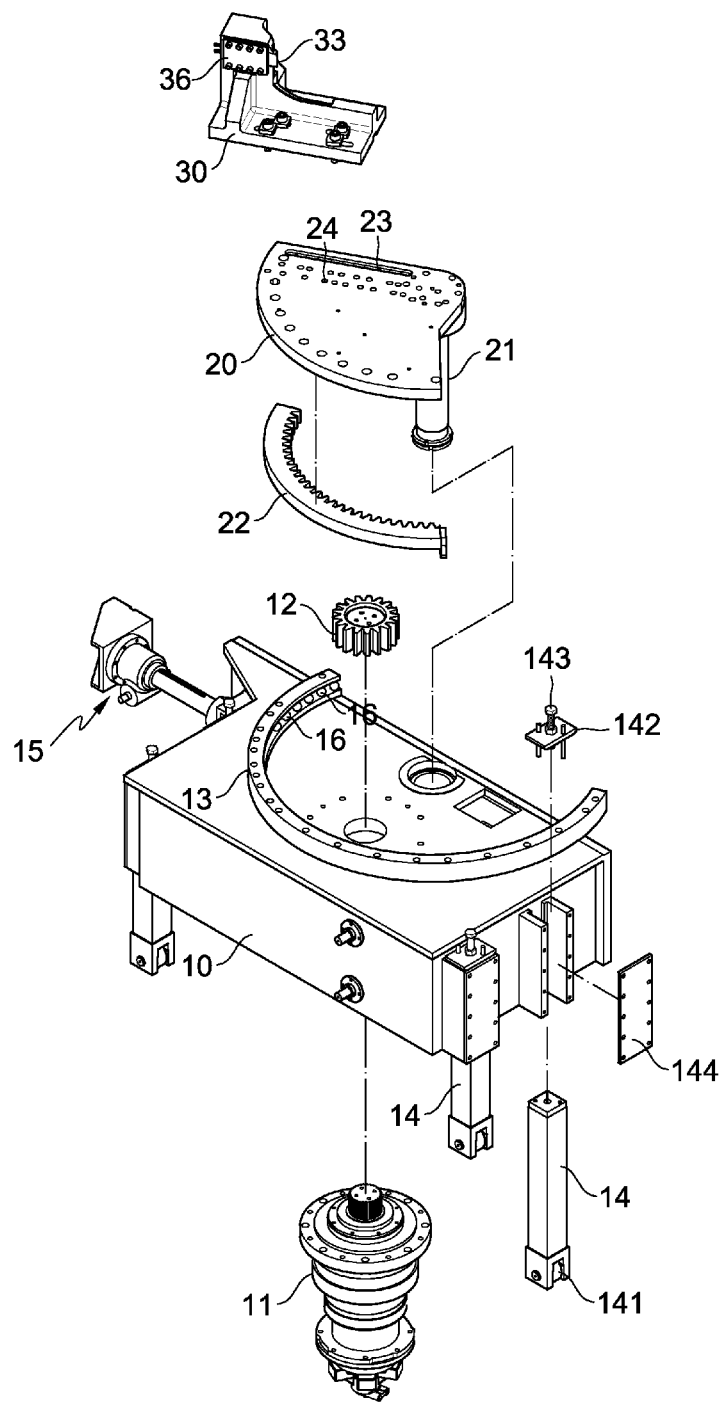
FIG. 2 is an exploded drawing of the ejection mechanism according to the embodiment of the present invention.

As shown in FIG. 2, the arched guiding track 13 further comprises a plurality of ball bearings 16 configured to improve movement of the arched row of teeth 22 along the arched guiding track 13.

Figure 15:
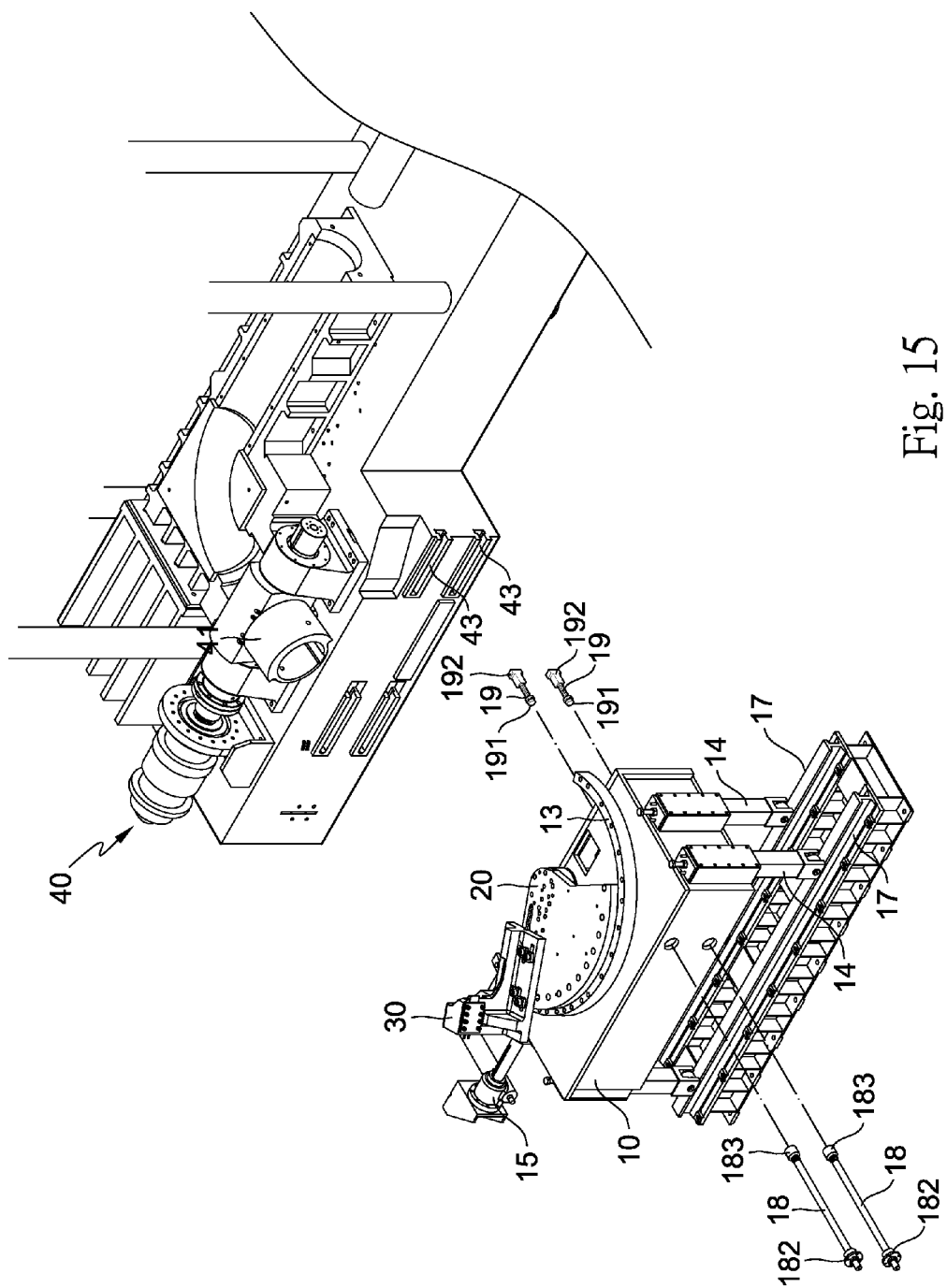
FIG. 15 is an exploded drawing of the base with a locking rod and a positioning rod according to the embodiment of the present invention.

As shown in FIGS. 13, 14 and 15, the base 10 further comprises two sliding tracks 17, and the sliding track 17 is respectively disposed below the supporting elements 14 and engage with the rolling wheels 141 of the supporting elements 14.

Figure 16:
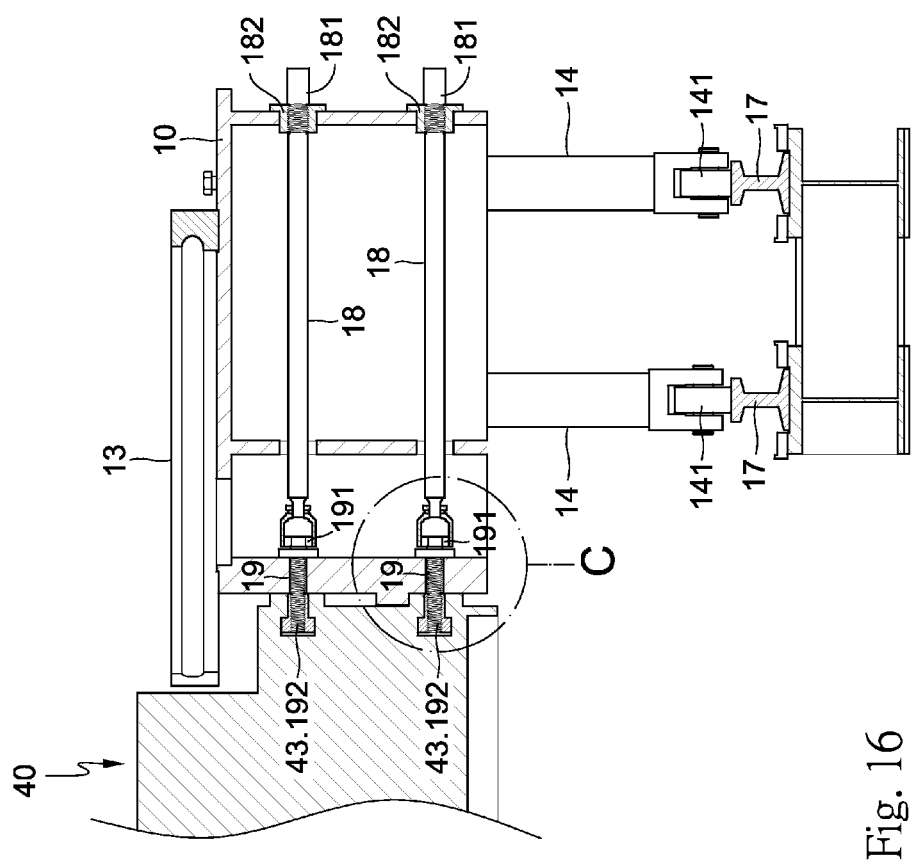
FIG. 16 is a cross-section view of a T-shaped block of a positioning rod pushing against to a T-shaped slot of the elbow pipe forming device according to the embodiment of the present invention.
Figure 17:
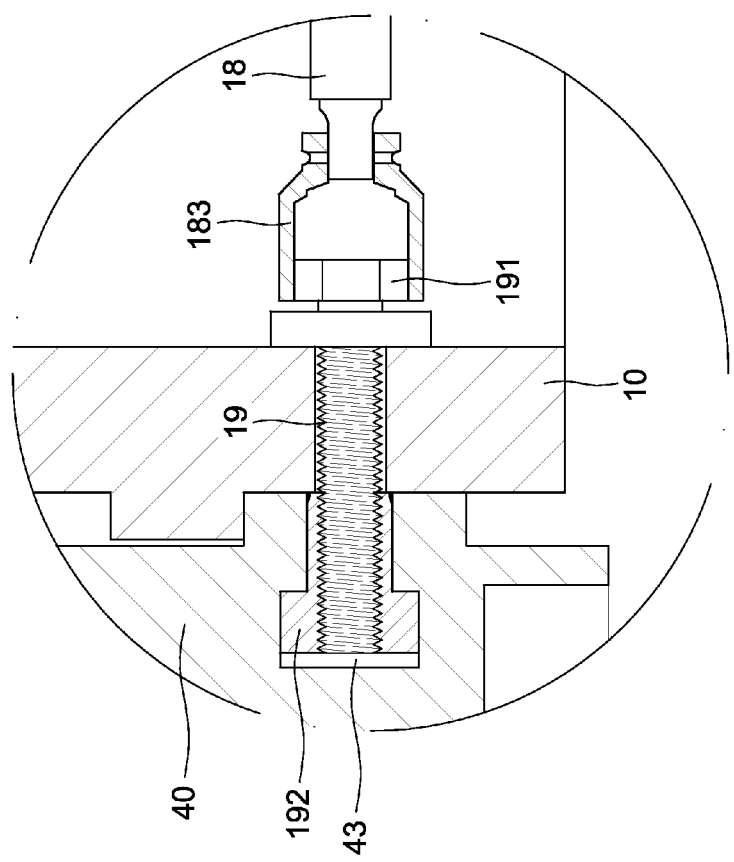
FIG. 17 is a local detail view of the section C shown in FIG. 16.

Moreover, As shown in FIGS. 15, 16 and 17, the base 10 includes a locking rod 18, the locking rod 18 has a threaded section 181 at an end engaging with the base 10 by a securing member 182, and another end of the locking rod 18 is rotatably connected to a rotatable engaging member 183. The engaging member 183 is preferably a hexagon-shaped. A positioning rod 19 utilizes an engaging block 191 to correspondingly engage with the engaging member 183 of the locking rod 18. Another end of the positioning rod 19 provided with a T-shaped block 192 that correspondingly engages with a T-shaped slot 43 disposed on a front side of the elbow pipe forming device 40. With backward movement of the securing member 182 and the threaded section 181 of the locking rod 18, the positioning rod 19 also moves backward, and the T shaped block 192 of the positioning rod 19 engages tightly with the T shaped slot 43 of the elbow pipe forming device 40 such that the base 10 also securely engages with the elbow pipe forming device 40.

With the above-mentioned description, following benefits can be obtained:

(A) Since the rotating gear 12 rotates the rotation disk 20 to make the feeding member 33 to push out the elbow pipe 50 out from the mold core 42, there is no need for manual or both hydraulic cylinder and pneumatic cylinder removal.

(B) The rotating gear 12 directly drives the arched row of teeth 22 of the rotation disk 20, therefore the feeding station 30 is capable of pushing the elbow pipe 50 smoothly.

Figure 18:
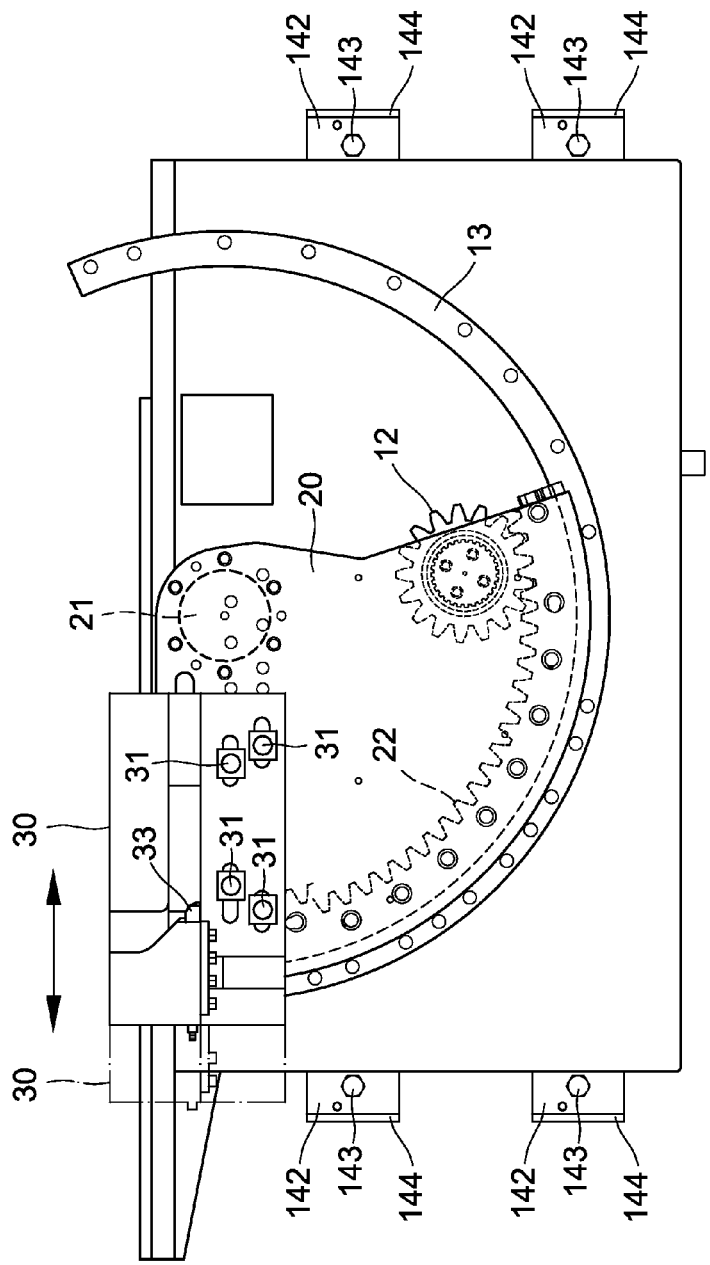
FIG. 18 is a top view of showing the feeding station at a different position on the rotation disk according to the embodiment of the present invention.

(C) The feeding station 30 is secured onto the rotation disk 20 and its position is adjustable according to the guiding slot 23 (as shown in FIG. 18), which is designed for different sizes of the mold core 42 and the elbow pipe 50 when the feeding member 33 of the feeding station 30 pushes the elbow pipe 50 out from the mold core 42.

(D) The feeding member 33 of the feeding station 30 is pushes out by the spring 35 to make contact with the mold core 42 and the elbow pipe 50, which provides accuracy, efficiency and convenience.

(E) The supporting element 14 and the rolling wheel 141 of the base 10 allow the base 10 to be moved for different sizes of the elbow pipe 50, such that the rotation disk 20 and the feeding station 30 disposed on the base 10 is able to push the elbow pipe 50 out from the mold core 42.

(F) The T-shaped block 192 of the positioning rod 19 correspondingly engages with a T-shaped slot 43 disposed on a front side of the elbow pipe forming device 40, with backward movement of the securing member 182 and the threaded section 181 of the locking rod 18, the positioning rod 19 also moves backward, and the T shaped block 192 of the positioning rod 19 engages tightly with the T shaped slot 43 of the elbow pipe forming device 40 such that the base 10 also securely engages with the elbow pipe forming device.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. An ejection mechanism comprising:
   a base;
   a rotation disk; and
   a feeding station;
   wherein the base is configured for mounting of the rotation disk and the feeding station, the base capable of being disposed adjacent to an elbow pipe forming device and corresponding to a lifting shaft of the elbow pipe forming device;
   the base has a driving motor, and the driving motor is rotatably connected to a rotating gear such that the rotating gear is able to be driven by the driving motor to rotate on the base;
   the base further includes an arched guiding track, and the arched guiding track is disposed around the rotating gear;
   the base further includes a supporting element respectively on two sides of the base, and each supporting element is provided with a rolling wheel at an end of the supporting element;
   the rotation disk is fan-shaped and is rotatably coupled to the base by a rotating shaft such that the rotation disk is aligned above the arched guiding track; and the rotation disk is further provided with an arched row of teeth on a bottom of the rotation disk corresponding to the rotating gear of the base, and the arched row of teeth are adjacent to an inner edge of the arched guiding track of the base;
   the rotation disk driven by the rotating gear causes the arched row of teeth to rotate and also to simultaneously cause the rotation disk to rotate around the rotating shaft on the arched guiding track;
   the rotation disk further includes a guiding slot and a plurality of securing holes;
   the feeding station is coupled to the guiding slot and locked with the screw holes of the rotation disk with a plurality of securing members, the feeding station further including a limiting slot with a feeding member, an end of the feeding member pivoted with a limiting rod, another end of the limiting rod protruding through the limiting slot and connected to a stopping block;
   the limiting rod is jacketed with a spring and two ends of the spring respectively push against the limiting slot and the feeding member such that the feeding member is pushed out by the spring and stopped by the stopping block; and
   the limiting slot is covered by a cover configured to secure the feeding member.

2. The ejection mechanism as claimed in claim 1, wherein the supporting elements are pivoted onto two opposite sides of the base and assembled with a top board, an adjustable bolt, and a side board, to configure the base for varying movements and heights.

3. The ejection mechanism as claimed in claim 1, wherein a screw drive mechanism is coupled to the base, and an end of the screw drive mechanism is coupled to the elbow pipe forming device, such that the base is capable of being driven by the screw drive mechanism to move along elbow pipe forming device.

4. The ejection mechanism as claimed in claim 1, wherein the arched guiding track further comprises a plurality of ball bearings configured to improve movement of the arched row of teeth along the arched guiding track.

5. The ejection mechanism as claimed in claim 1, wherein the base further comprises at least one sliding track, the sliding track disposed below the supporting elements and engaging with the rolling wheels of the supporting elements.

6. The ejection mechanism as claimed in claim 1, wherein the base further includes a locking rod, the locking rod having a threaded section at an end engaging with the base, and another end of the locking rod is rotatably connected to a rotatable engaging member, and a positioning rod utilizes an engaging block to engage with the engaging member of the locking rod, another end of the positioning rod provided with a T-shaped block that correspondingly engages with a T-shaped slot disposed on a front side of the elbow pipe forming device.

* * * * *